(12) United States Patent
Fujimoto et al.

(10) Patent No.: US 7,415,202 B2
(45) Date of Patent: Aug. 19, 2008

(54) IMAGE TAKING DEVICE, METHOD FOR CONTROLLING LIGHT SOURCES AND COMPUTER PROGRAM

(75) Inventors: Naoyuki Fujimoto, Kato (JP); Takayuki Sugiura, Kato (JP); Kiyoshi Chinzei, Kato (JP); Mieko Nakano, Kato (JP); Atsushi Miki, Kato (JP); Shuji Kimura, Kato (JP); Mitsuhiro Gotoh, Kato (JP); Satoshi Fukui, Kato (JP); Toshio Endoh, Kawasaki (JP); Takahiro Aoki, Kawasaki (JP); Mitsuaki Fukuda, Kawasaki (JP); Masaki Watanabe, Kawasaki (JP); Shigeru Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/229,571

(22) Filed: Sep. 20, 2005

(65) Prior Publication Data
US 2006/0110145 A1 May 25, 2006

Related U.S. Application Data

(63) Continuation of application No. PCT/JP03/03989, filed on Mar. 28, 2003.

(51) Int. Cl.
*G03B 15/03* (2006.01)
*H04N 5/222* (2006.01)

(52) U.S. Cl. .................. 396/164; 396/182; 348/370; 362/11

(58) Field of Classification Search .............. 396/14, 396/15, 18, 199, 164, 182; 348/370, 371, 348/175, 176, 187, 188; 362/5, 11, 18
See application file for complete search history.

(56) References Cited

U.S. PATENT DOCUMENTS

| | | | |
|---|---|---|---|
| 4,931,866 A * | 6/1990 | Charlesworth et al. | 348/370 |
| 5,016,282 A | 5/1991 | Tomono et al. | 382/117 |
| 5,163,102 A | 11/1992 | Yamazaki et al. | 382/274 |
| 6,040,895 A * | 3/2000 | Haas | 355/70 |
| 6,400,455 B1 | 6/2002 | Kurokawa et al. | 356/239.1 |

(Continued)

FOREIGN PATENT DOCUMENTS

CN 1137659 12/1996

(Continued)

OTHER PUBLICATIONS

Communication from KIPO dated Oct. 31, 2006 regarding corresponding Korean Application, along with Japanese translation of KIPO Communication.

(Continued)

*Primary Examiner*—W. B. Perkey
*Assistant Examiner*—Rishi S Suthar
(74) *Attorney, Agent, or Firm*—Staas & Halsey LLP

(57) ABSTRACT

An image taking device with a lighting device includes a light irradiating portion for irradiating light to a subject and a light receiving portion for receiving reflected light from the subject that is irradiated by the light. The light irradiating portion is structured to have a plurality of light sources that are arranged so as to surround the light receiving portion. Each of the light sources is adjusted to emit light of an intensity corresponding to an arrangement position.

16 Claims, 15 Drawing Sheets

U.S. PATENT DOCUMENTS

| | | | |
|---|---|---|---|
| 6,617,559 B1 * | 9/2003 | Emery et al. | 250/205 |
| 2002/0047624 A1 * | 4/2002 | Stam et al. | 315/291 |
| 2002/0089599 A1 * | 7/2002 | Menning | 348/370 |
| 2002/0181774 A1 | 12/2002 | Ishikura | 382/190 |

FOREIGN PATENT DOCUMENTS

| | | |
|---|---|---|
| EP | 0 413 817 | 2/1991 |
| EP | 0731426 | 9/1996 |
| EP | 0 924 748 | 6/1999 |
| JP | 2-138673 | 5/1990 |
| JP | 8-83391 | 3/1996 |
| JP | 11-183389 | 7/1999 |
| JP | 11-203452 | 7/1999 |
| JP | 2002-16907 | 1/2002 |
| JP | 2002-92616 | 3/2002 |
| WO | WO 01/29542 | 4/2001 |

OTHER PUBLICATIONS

Office Action mailed on Jun. 23, 2006 for the corresponding Chinese Patent Application.

Japanese Office Action dated Mar. 6, 2007 for corresponding Japanese Patent Application No. 2004-570133.

European Communication dated Nov. 23, 2007 for corresponding European Patent Application No. 03715607.2.

* cited by examiner

IN CASE OF THE FIRST EMBODIMENT

IN CASE ALL THE LIGHTING DEVICES EMIT LIGHT OF THE SAME INTENSITY

FA1

AN IMAGE BEFORE CALIBRATION PROCESSING

AN AIM IMAGE (AN IDEAL IMAGE)

FIG. 12

CALIBRATION SCREEN

|  | ROUGH ADJUSTMENT | FINE ADJUSTMENT |
|---|---|---|
| 1: | 180 | 25 |
| 2: | 155 | −36 |
| 3: | 170 | −16 |
| 4: | 165 | 97 |
| 5: | 90 | −34 |
| 6: | 80 | 61 |
| 7: | 82 | 101 |
| 8: | 75 | −21 |

RETAKE  SETTING  CANCEL

HG1

6DB

| USER ID | BLOOD VESSEL PATTERN DATA |
|---|---|
| A001 |  ~71 |
| A002 |  ~71 |
| A003 |  ~71 |
| ⋮ | ⋮ |

IMAGE TAKING DEVICE, METHOD FOR
CONTROLLING LIGHT SOURCES AND
COMPUTER PROGRAM

This application is a continuing application, filed under 35 U.S.C. §111(a), of International Application PCT/JP2003/003989, filed Mar. 28, 2003, incorporated by reference herein.

TECHNICAL FIELD

The present invention relates to a noncontact type image taking device.

BACKGROUND ART

Conventionally, there is a technique proposed for identifying a person and authenticating the personal identification in accordance with a physical characteristic of a human body. A physical characteristic obtained by an image taking device is compared with a physical characteristic that is registered in advance for a personal identification or personal authentication.

Image taking devices can be divided broadly into a contact type in which the device touches the human body and a noncontact type in which the device does not touch the human body. A noncontact type is desired in a place where an indefinite number of people uses an image taking device, from viewpoints of resistance to soiling, a hygienic aspect and psychological inhibition.

For example, when the image taking device is used for a control of entering and leaving a facility, the image taking process should be performed ever time when a person enters or leaves the facility. In this case, a contact type device is often touched by people. Therefore, a glass face for touching with a hand may become dirty so that the image taking process cannot be performed correctly. In addition, the hygienic problem or the psychological inhibition may be caused by touching the dirty face. For this reason, a noncontact type device is desired.

A noncontact type is superior to a contact type also in the case where the image taking device is used in a place with a strict hygienic rule such as a medical institute or a research institute. In addition, needs of noncontact products are increasing recently as a social trend as understood from that various antibacterial goods and hygienic goods have becomes hit goods.

For taking an image of a physical characteristic, a lighting device is used usually so as to obtain a desired image by removing an influence of external light. However, if the subject is away from the device, it is difficult to irradiate uniform light to the subject, resulting in deterioration of image quality. Therefore, it is difficult to realize a noncontact type device.

In order to solve this problem, Japanese unexamined patent publication No. 2002-92616 discloses a technique for adjusting quantity of light of a light source in accordance with an obtained image. However, there is a problem that as it is necessary to keep the light source lighting normally for taking an image, power consumption may increase and process time increase because of plural times of taking images.

An object of the present invention is to solve this problem by providing a noncontact type image taking device that can obtain an image of good image quality.

DISCLOSURE OF THE INVENTION

An image taking device according to the present invention, which is an image taking device for irradiating a subject with a uniform light in a noncontact manner, includes a light irradiating portion for irradiating light to a subject and a light receiving portion for receiving reflected light from the subject that is irradiated by the light from the light irradiating portion. The light irradiating portion includes a plurality of light sources that are arranged so as to surround the light receiving portion. Each of the light sources is adjusted to emit light of an intensity corresponding to an arrangement position.

Preferably, each of the light sources is adjusted to emit light of an intensity that is higher as a distance between the arrangement position thereof and the center of an image taking range increases.

Moreover, the image taking device further comprises a control portion for adjusting an intensity of light that is emitted from each of the light sources by controlling current supplied to each of the light sources.

Moreover, the image taking device further comprises a luminous intensity information obtaining portion for obtaining luminous intensity information that indicates intensity of light that the subject receives from each of the light sources in accordance with reflected light received by the light receiving portion, the reflected light being received from an object having a uniform reflection factor when each of the light sources irradiate light to the object. The control portion performs the control in accordance with the luminous intensity information so that intensities of light emitted by the light sources having the same distance from the light receiving portion become the same value.

Moreover, control of the lighting device is performed in accordance with a length of an exposure time.

Moreover, control of the lighting device is performed in accordance with exposure timing.

Moreover, when the subject is a human body, light emission quantity, light emission time, and a wavelength of emitted light of the light irradiating portion are adjusted so that an influence to the human body can be avoided.

Moreover, when the subject is a hand, a position of the light irradiating portion is set corresponding to a dimension of the hand.

Moreover, when the subject is a blood vessel pattern of a human body, a wavelength of the light irradiating portion is adapted to taking an image of the blood vessel pattern of the human body.

Moreover, the image taking device includes a partition member for separating optically a space in which the light sources are disposed from a space in which the light receiving portion is disposed.

Moreover, the image taking device includes a box-like casing having an open front face that is opposed to the subject when taking an image. The front face is provided with a filter plate that passes infrared rays and cuts light having a wavelength shorter than the infrared rays. The light sources are disposed inside the casing at positions close to a rear face that is opposite to the front face. The inner surface of the casing is treated to prevent light reflection.

A personal authentication system according to the present invention, which is a system for authenticating a person, includes the above-mentioned image taking device; a storage portion for storing an image of each person in connection with ID information for identifying the person, the image of each person being taken in advance; an input portion for entering ID information; and an authenticating portion for authenticating a person who entered the ID information by comparing the image corresponding to the ID information stored in the storage portion with the image obtained by the image taking device that takes an image of the person who entered the ID information for authentication.

In the case of a personal authentication system for authenticating a person in a plurality of facilities, it is structured as follows. Namely, the system includes an input portion for entering ID information for identifying a person and the above-mentioned image taking device, which are provided for each of the facilities; and a server that is connected to each of the image taking devices. The server includes a storage portion for storing an image of each person in connection with ID information of the person, the image of each person being taken in advance, and an authenticating portion for authenticating a person who entered the ID information by comparing the image stored in the storage portion corresponding to the ID information entered by the input portion with the image obtained by the image taking device that takes an image of the person who entered the ID information for authentication.

In addition, the above-mentioned personal authentication system for authenticating (identifying) a person can be used for checking a person who can enter a specific room, checking a customer at a financial terminal, checking arrival of employees or checking a person who can log in a personal computer.

BRIEF DESCRIPTION OF THE DRAWINGS

FIG. 12 shows an example of a setting screen.

BEST MODE FOR CARRYING OUT THE INVENTION

The present invention will be described in more detail with reference to the attached drawings.

First Embodiment

Figure 1:
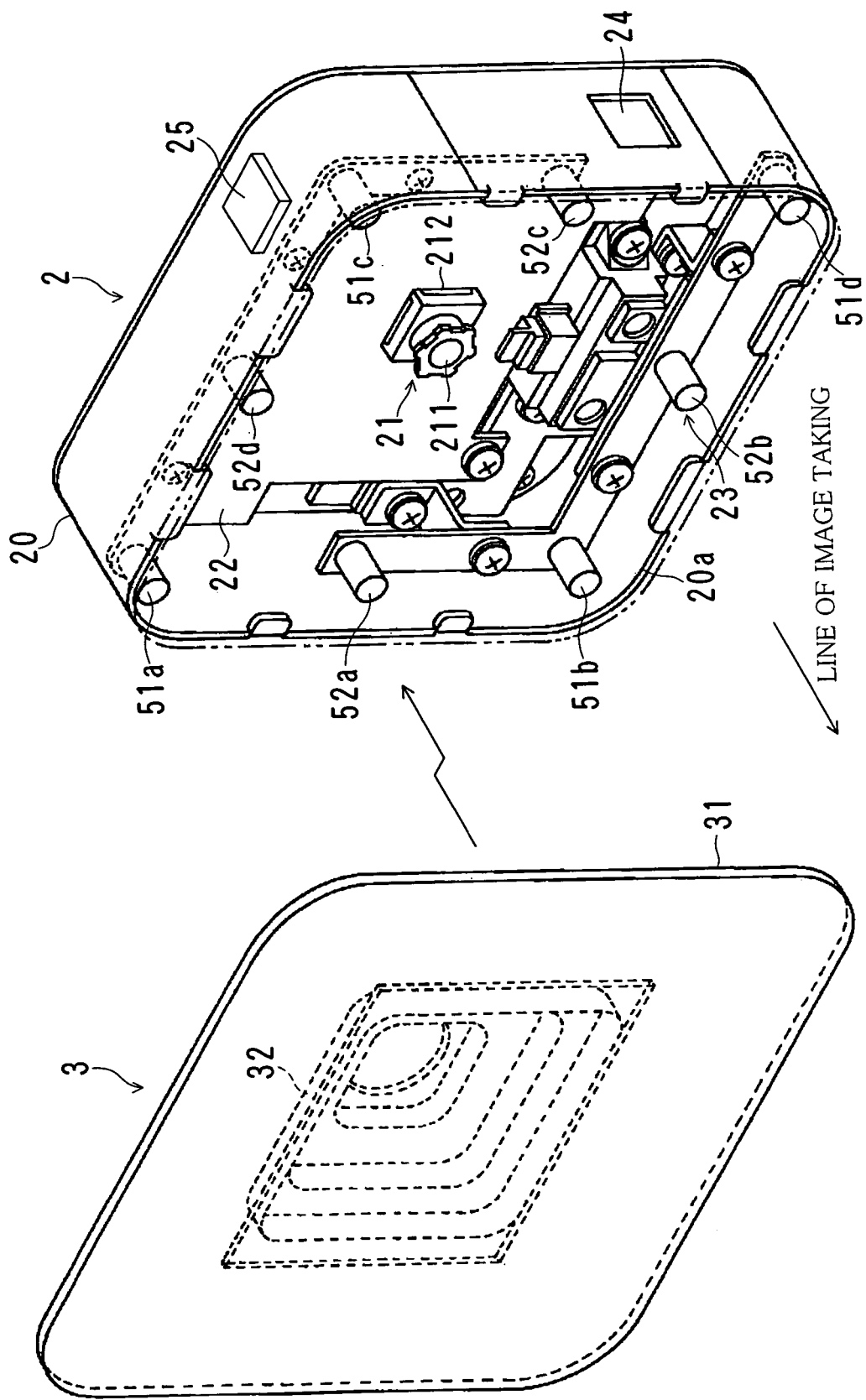
FIG. 1 is a perspective view showing an example of a structure of an image taking device.
Figure 2:
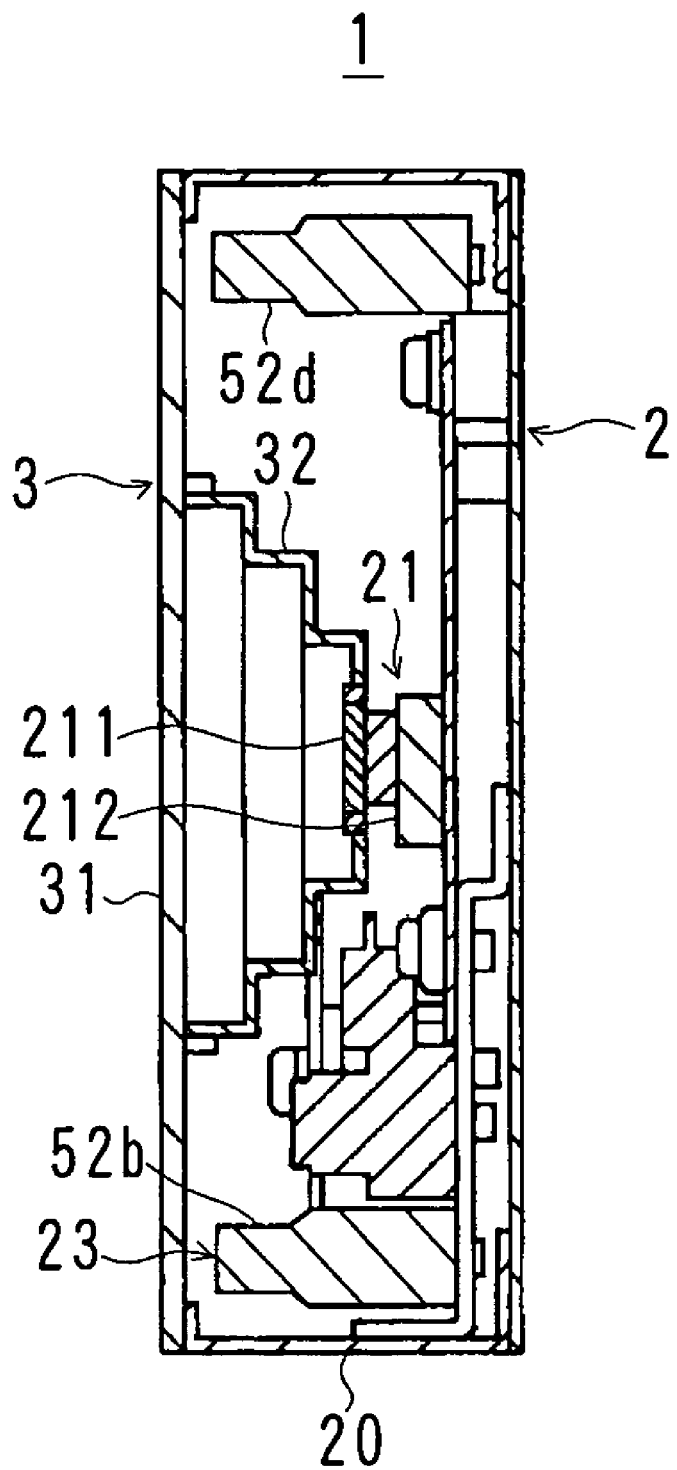
FIG. 2 is a cross section of the image taking device at the middle portion viewed from the side.
Figure 3:
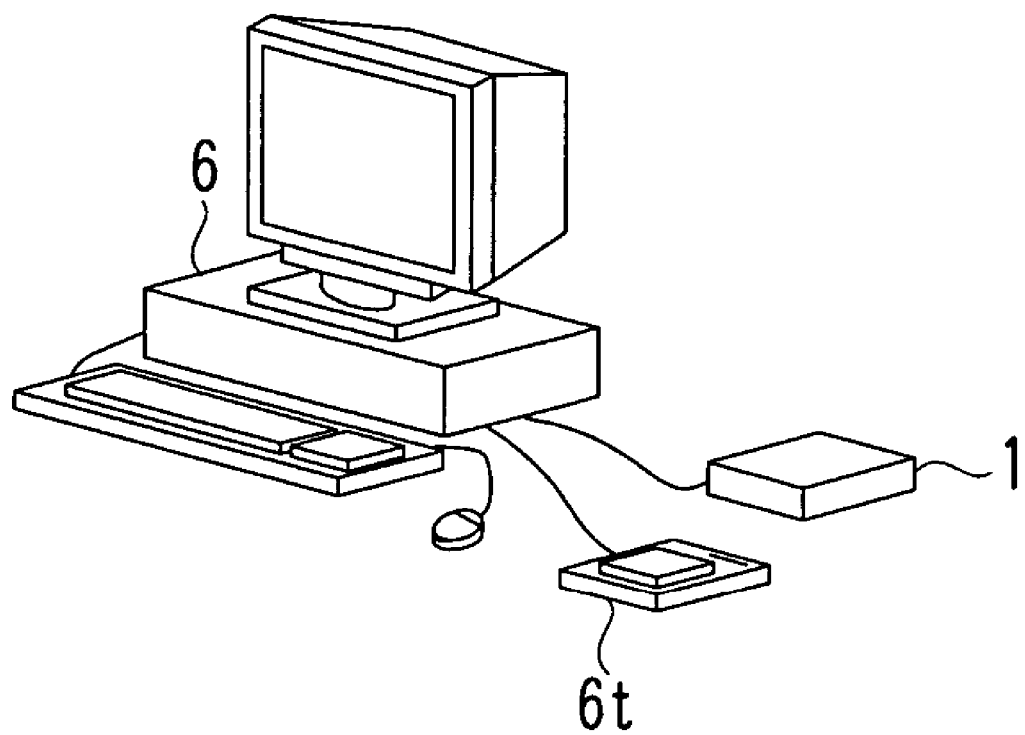
FIG. 3 shows an example of a security system.
Figure 4:
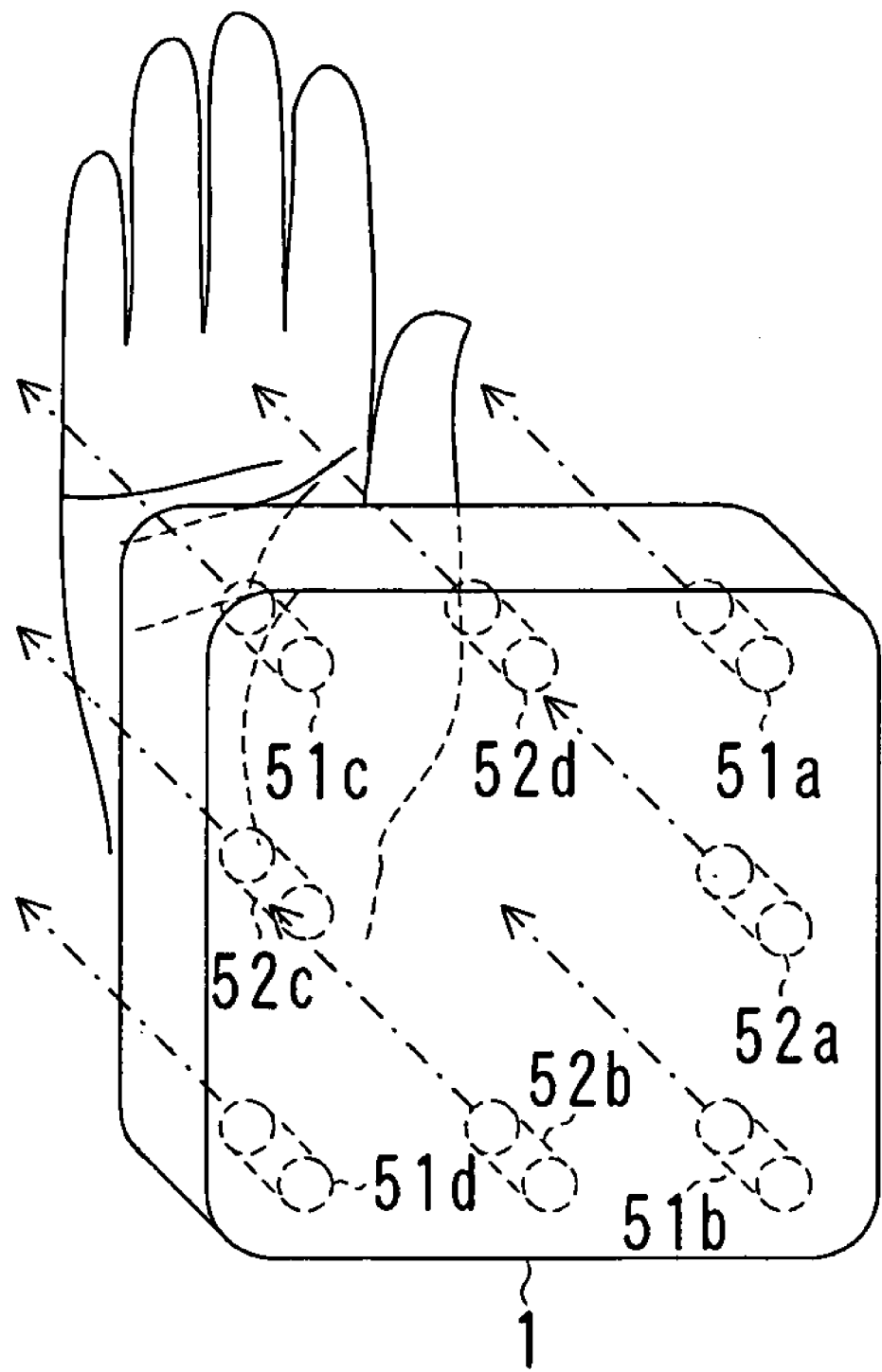
FIG. 4 shows an example of a situation in which an image of a hand is taken.
Figure 5:
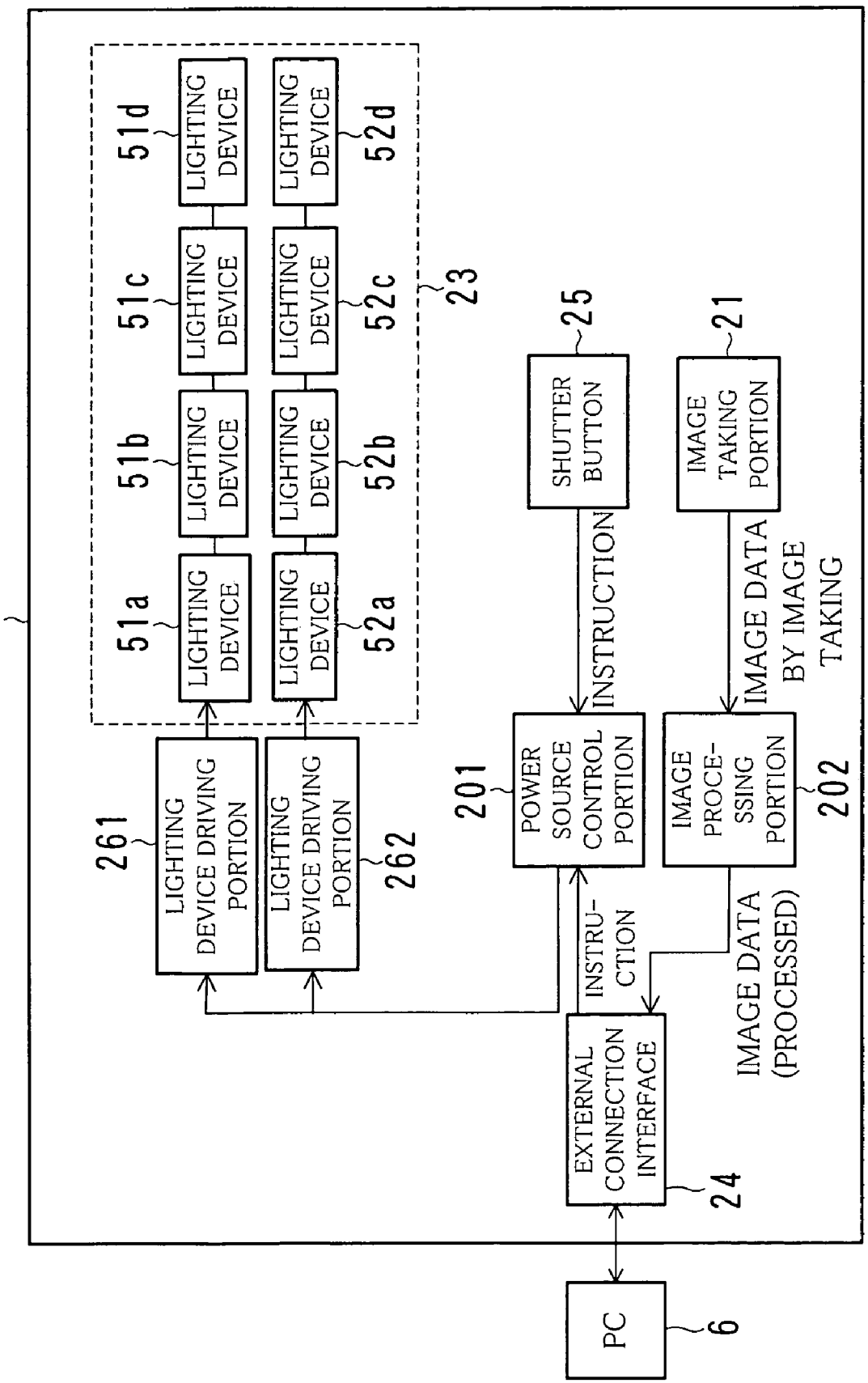
FIG. 5 is a block diagram showing an example of a functional structure of the image taking device according to a first embodiment.
Figure 6A:
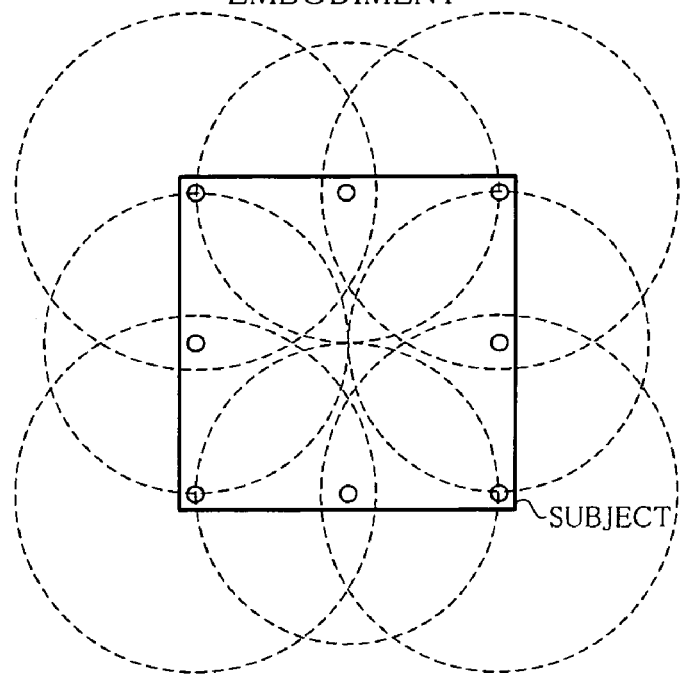
FIGS. 6(a) and 6(b) show an examples of a distribution of intensity of light that is irradiated onto a subject.
Figure 6B:
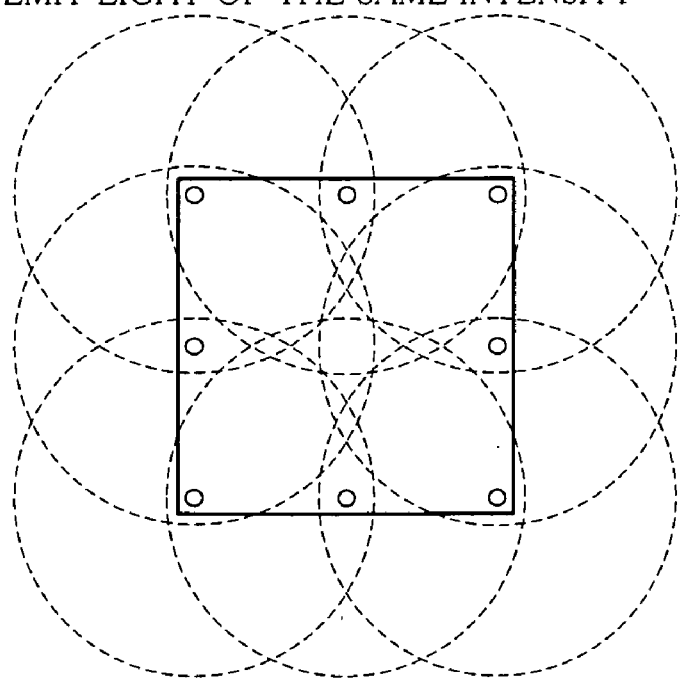
Figure 7:
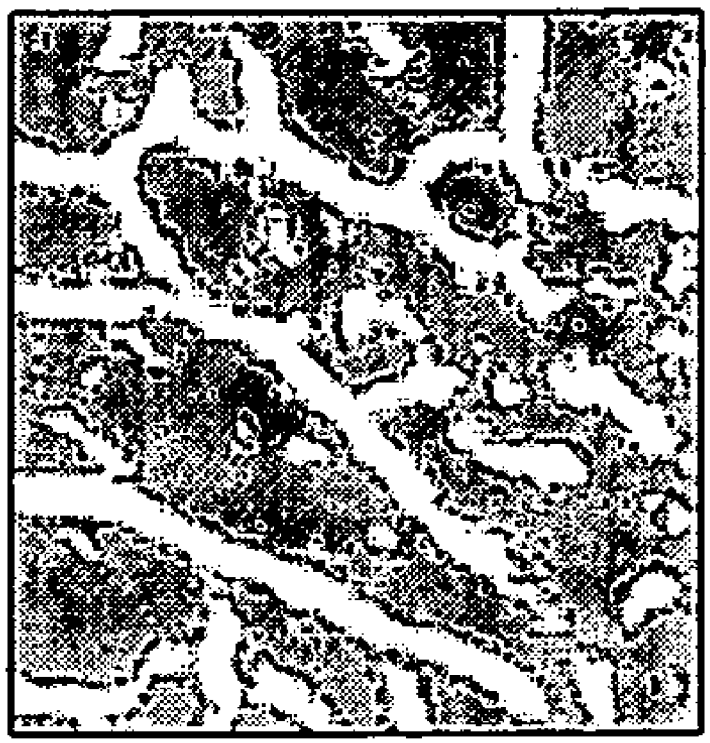
FIG. 7 shows an example of an image FA1 of a blood vessel pattern in a hand after image processing.

FIG. 1 is a perspective view showing an example of a structure of an image taking device 1, FIG. 2 is a cross section of the image taking device 1 at the middle portion viewed from the side, FIG. 3 shows an example of the security system 100, FIG. 4 shows an example of a situation in which an image of a hand is taken, FIG. 5 is a block diagram showing an example of a functional structure of the image taking device 1 according to a first embodiment, FIG. 6 shows an example of a distribution of intensity of light that is irradiated onto a subject, FIG. 7 shows an example of an image FA1 of a blood vessel pattern in a hand after image processing, and FIG. 8 shows a variation of an arrangement of lighting devices of the image taking device viewed from the front.

The image taking device 1 according to the present invention includes an image taking device main body 2 and a main body cover 3 as shown in FIGS. 1 and 2. When taking an image, the main body cover 3 is attached to the front face 20a of the image taking device main body 2 in advance. Then, a shutter is released with letting the subject is opposed to the front face of the image taking device 1 as shown in FIG. 4.

The image taking device main body 2 includes a casing (enclosure) 20, an image taking portion 21, a circuit board 22, an irradiation portion 23, an external connection interface 24 and a shutter button 25. In addition, the image taking device main body 2 can be connected to a personal computer 6 via the external connection interface 24 as shown in FIG. 3.

The image taking portion 21 includes a lens 211 and an image sensor 212. As the image sensor 212, a CMOS type image sensor can be used, for example.

The circuit board 22 includes a control circuit for controlling each portion of the image taking device 1 that will be described later and for D/A conversion, a ROM for storing a computer program (firmware) and a CPU. The CPU performs operational processes in accordance with an instruction from the personal computer 6 or the shutter button 25, a computer program or data obtained by taking an image. By this structure, the image taking device 1 realizes functions including a power source control portion 201, an image processing portion 202 and lighting device driving portions 261 and 262 as shown in FIG. 5.

The irradiation portion 23 includes plural lighting devices (lighting devices 51a-51d and lighting devices 52a-52d) as light sources.

These lighting devices are arranged so as to satisfy the following conditions. Namely, (1) a distance between the lens 211 and each of the lighting devices 51a-51d is the same as others, and (2) a distance between the lens 211 and each of the lighting devices 52a-52d is the same as others.

As shown in FIG. 5, the lighting device driving portions 261 and 262 respectively drive these lighting devices by supplying current to the lighting devices 51a-51d and 52a-52d in accordance with an instruction from the power source control portion 201.

The power source control portion 201 controls the lighting device driving portions 261 and 262 so that a value of current supplied to the lighting devices 51a-51d becomes larger than a value of current supplied to the lighting devices 52a-52d. Therefore, the lighting devices 51a-51d emit light having intensity higher than the lighting devices 52a-52d do. The current supplied to these lighting devices are obtained from the personal computer 6 via the external connection interface 24.

Thus, by setting a difference between intensities of light emitted from the lighting devices 51a-51d and 52a-52d, luminance of light on the subject can be substantially uniform.

Namely, if all the lighting devices emit light of the same intensity when the subject that is an object of taking an image is irradiated with light as shown in FIG. 4, the light may be concentrated in a part of an image taking range (the subject) so that unevenness of lighting becomes conspicuous. In the image taking device 1 of this embodiment, for example, light may be concentrated in the middle portion of the image taking range as shown in FIG. 6(b). Note that circles drawn with dotted lines in FIGS. 6(a) and 6(b) indicate positions where the subject is irradiated by light from the lighting devices at the same intensity (luminous intensity). Namely, they indicate distribution of luminous intensity of light irradiated by lighting devices or contour lines of luminous intensities. In the example shown in FIG. 6(b), eight circles are overlapped in the middle portion of the image taking range, while only about three circles are overlapped in the four corners of the subject. Therefore, it is understood that the light is concentrated in the middle portion relatively.

On the other hand, if the intensity of the lighting devices 51a-51d arranged at positions relatively farther from the middle portion of the subject (the image taking range) is set to a value larger than the intensity of the lighting devices 52a-52d arranged at positions relatively closer to the middle portion, contour lines of luminous intensity become as shown in FIG. 6(a). Namely, overlapping number of circles become six at most, so that the unevenness of lighting becomes less than the case where intensities of plural lighting devices are set to the same value.

With reference to FIGS. 1 and 2 again, the main body cover 3 includes a filter plate 31 made of a plastic plate or a glass plate and a lens cover 32 made of a plastic plate or the like.

The plural lighting devices emit light in synchronization with the shutter release and shutter speed (exposure time). Namely, the power source control portion 201 instructs the lighting device driving portions 261 and 262 to start supplying current at the moment when the shutter button 25 is pressed and the shutter is released. Then, it instructs to stop supplying current in accordance with the shutter speed.

It is possible to issue the instruction for releasing the shutter by the personal computer 6 instead of the shutter button 25.

Light reflected by the subject passes the filter plate 31 and enters the casing 20. Then, the light is focused on the image sensor 212 by the lens 211. The image sensor 212 generates image data by converting the light image into an electronic signal.

According to this embodiment, the subject can be irradiated by substantially uniform light so image of the subject can be taken appropriately.

The value of current that is supplied to the lighting devices 51a-51d and 52a-52d can be changed if necessary in accordance with a condition for taking an image. It may be set in accordance with a type, a position or intensity of light in the image taking site, a characteristic of the subject, a distance between the subject and the image taking device 1, the number of lighting devices or locations of them, for example.

As the image sensor 212, a CCD can be used instead of the CMOS sensor. Intensities of the lighting devices may be adjusted as follows. For example, an optical filter may be placed on the lighting devices 52a-52d so that the intensity thereof becomes lower than the lighting devices 51a-51d. Alternatively, lighting devices having different light emission intensities may be used as the lighting devices 51a-51d and the lighting devices 52a-52d.

Figure 8A:
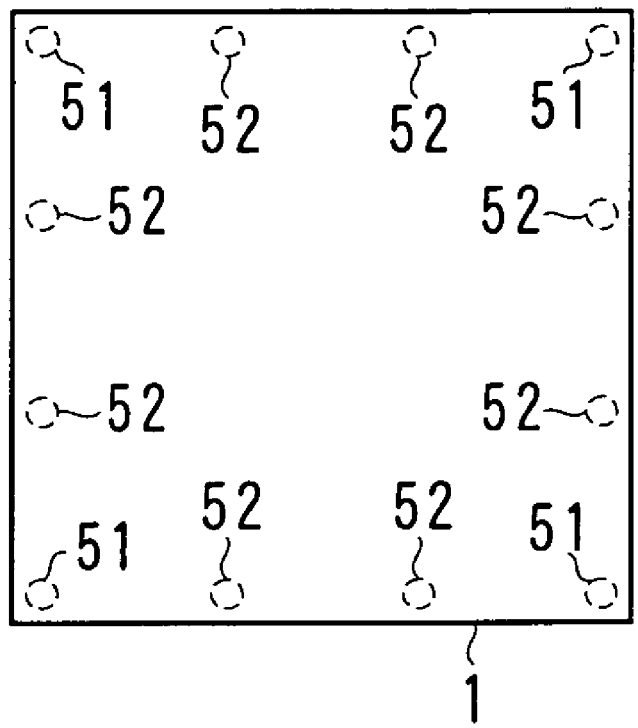
FIG. 8 shows a variation of an arrangement of lighting devices of the image taking device viewed from the front.
Figure 8B:
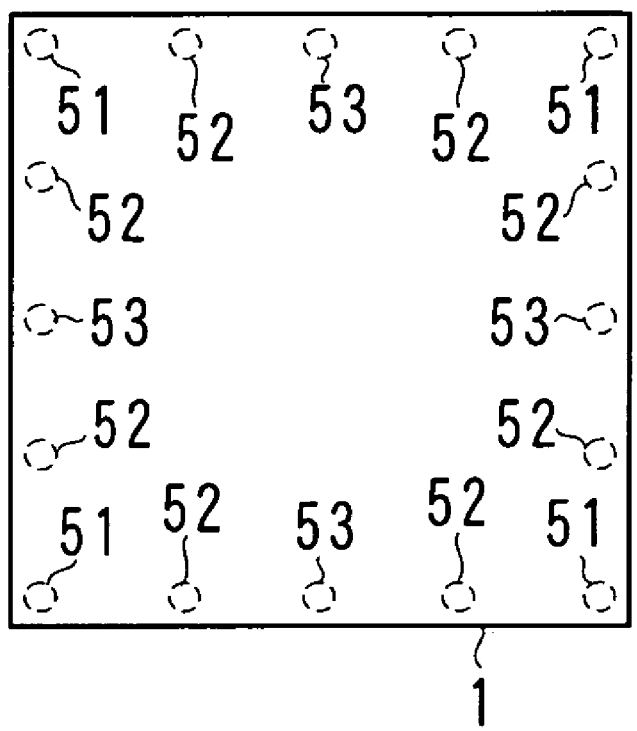

It is possible to arrange the lighting devices as shown in FIG. 8(a) and to supply the lighting device 51 with current larger than the lighting device 52. Alternatively, it is possible to arrange the lighting devices as shown in FIG. 8(b) and to adjust intensity of light to be proportional to a distance from the center of the image taking range.

It is possible to connect a circuit for fine adjustment of current in parallel with each of the lighting devices 51a-51d and 52a-52d shown in FIG. 5.

As the lighting device, an LED (a light emitting diode), an electric lamp (such as a light bulb), a fluorescent tube, a cathode ray tube, a xenon flash tube.

Second Embodiment

Figure 9:
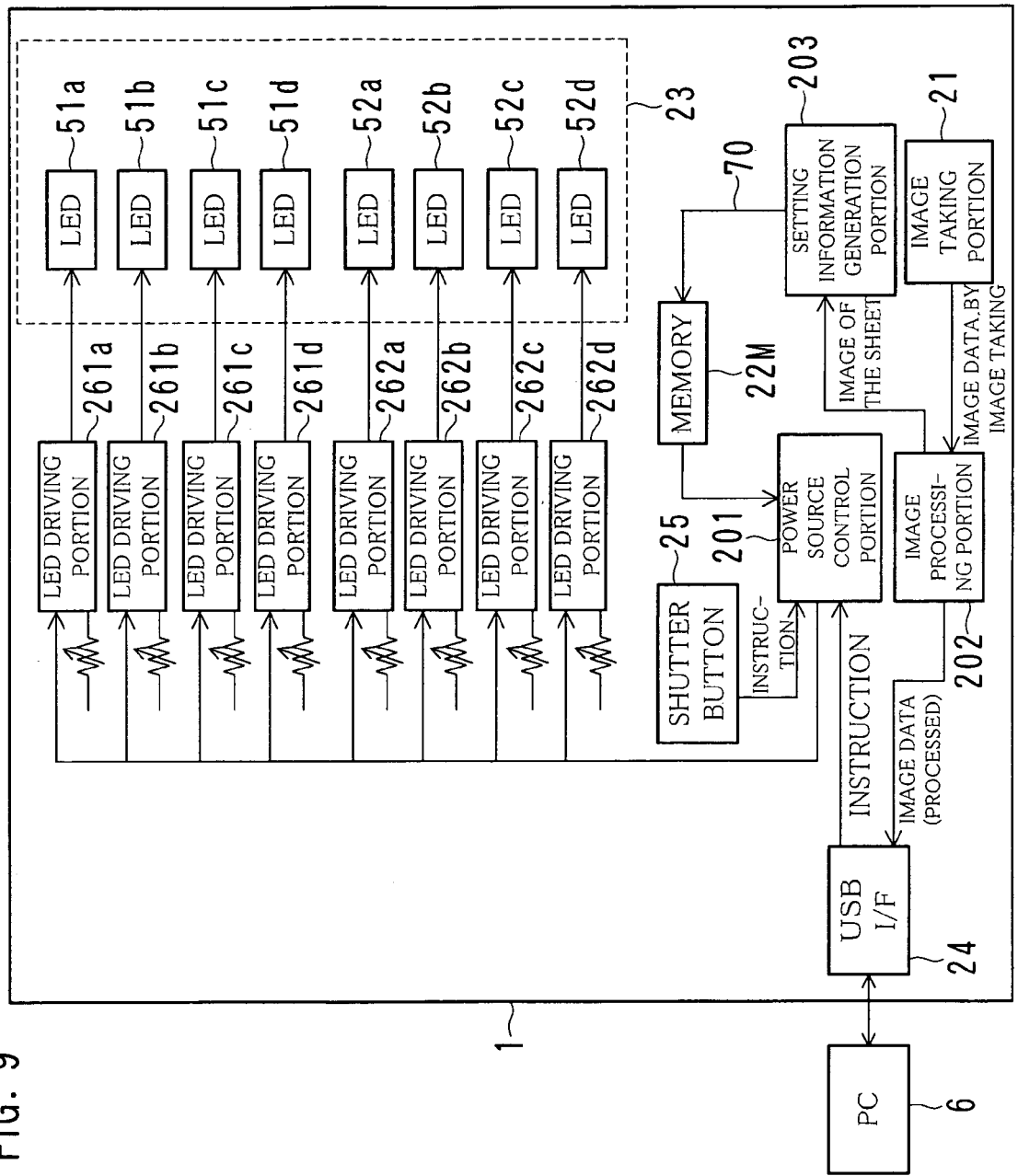
FIG. 9 is a block diagram showing an example of a functional structure of the image taking device according to a second embodiment.
Figure 10:
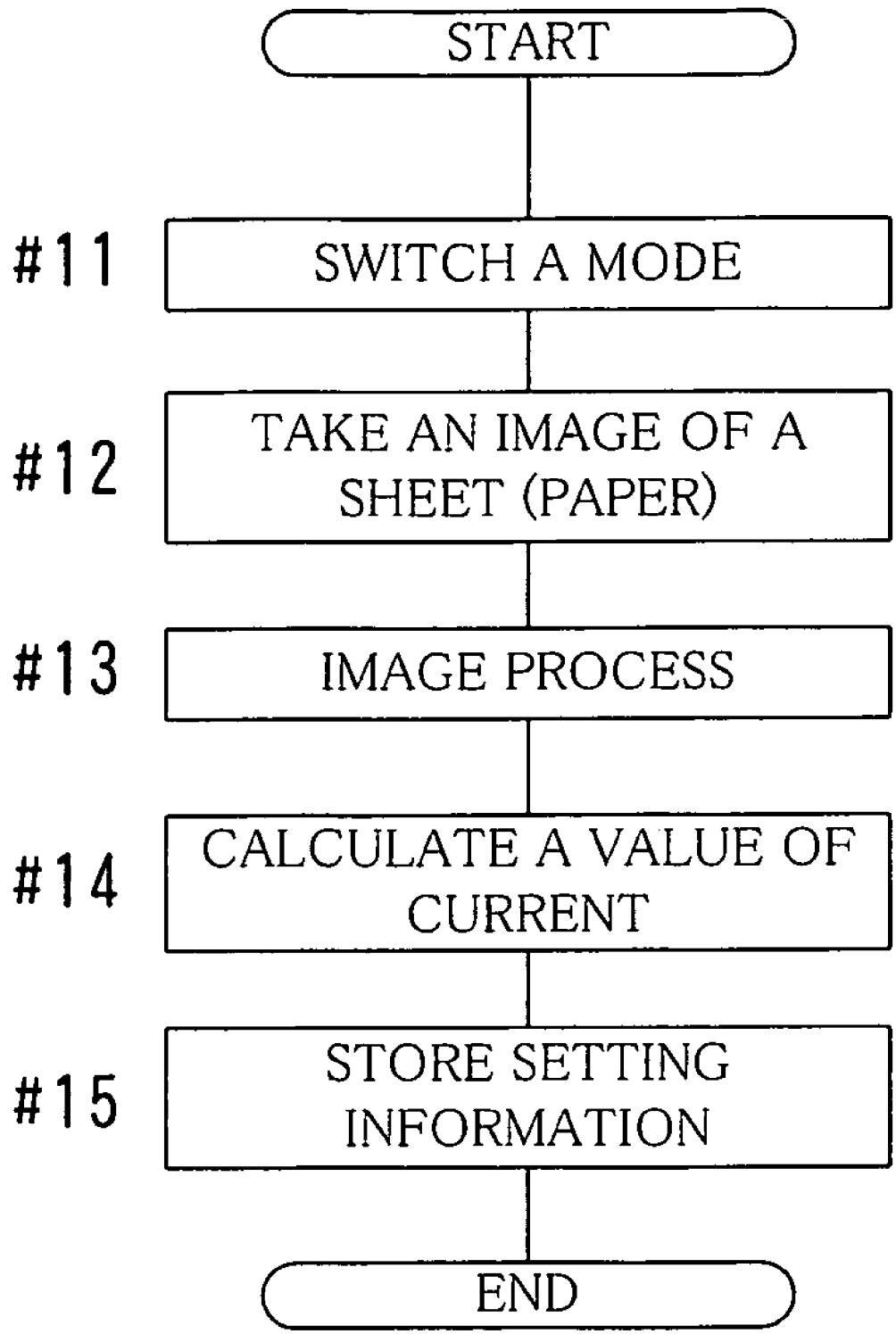
FIG. 10 is a flowchart showing an example of a flow of a calibration process.

FIG. 9 is a block diagram showing an example of a functional structure of the image taking device 1 according to a second embodiment, FIG. 10 is a flowchart showing an example of a flow of a calibration process, FIG. 11 shows an example of a distribution of intensity of light that is irradiated onto a calibration sheet, FIG. 12 shows an example of a setting screen HG1.

In the first embodiment, all the four lighting devices 51a-51d are supplied with the same value of current as shown in FIG. 5. Therefore, these lighting devices are supposed to emit light at the same intensity ideally. The same supposition can be done for the lighting devices 52a-52d.

Actually, however, the lighting devices have characteristics slightly different individually even if they are the same type. In addition, intensity of light emission can be varied when the lighting devices are attached to positions shifted from correct positions in the manufacturing process or altered due to a long period of use. As a result, each of the image taking devices 1 may have a different unevenness of the lighting intensity, so that some difference may be generated in the obtained images. The second embodiment is aimed at correcting unevenness of light intensity in each of the image taking devices 1, so that the obtained images can be more uniform than the case of the first embodiment.

A structure and contents of process of the image taking device 1 according to the second embodiment is basically the same as the image taking device 1 according to the first embodiment except for some points. Hereinafter, the different points between them will be described mainly.

As shown in FIG. 9, the LEDs 51a-51d are provided with LED driving portions 261, respectively. The LEDs 52a-52d are also provided with LED driving portions. Hereinafter, the LED driving portions 261 corresponding to LEDs 51a-51d may be referred to with suffixes "a"-"d" like "LED driving portion 261a". The LED driving portions 262 may be referred to similarly.

The image taking device 1 is provided with a memory 22M for storing setting information 70 of current to be supplied to LEDs 51a-51d and 52a-52d. This setting information 70 is generated by performing a calibration process, for example. This process is performed in the procedure as shown in FIG. 10.

First, the image taking device 1 is switched to a calibration mode by operation of an operating button that is provided to the personal computer 6 or the image taking device 1 (#11). An object having a uniform reflection factor is placed in front of the front face of the image taking device 1 so as to take an image (#12). For example, an image of a calibration sheet is taken, which is usually used for correcting (adjusting) difference of color property of a scanner. As the calibration sheet, a white sheet can be used.

Note that if the setting information 70 is already stored in the memory 22M when taking an image, the power source control portion 201 instructs the LED driving portions 261a-261d and 262a-262d to supply current to the LEDs 51a-51d and 52a-51d in accordance with the setting information 70. If the setting information 70 is not stored, the power source control portion 201 instructs the LED driving portions 261a-261d and 262a-262d to supply current in accordance with initial values of the image taking device 1 at the time of factory shipment.

Figure 11A:
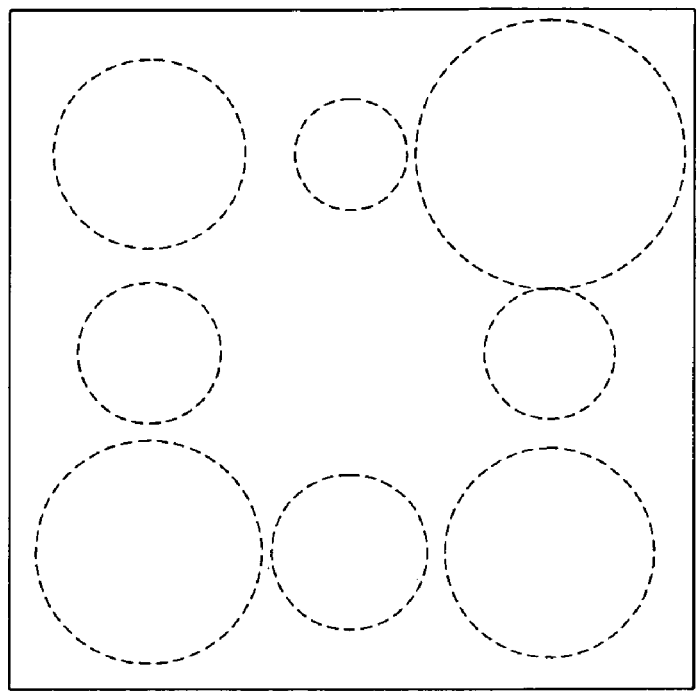
FIG. 11 shows an example of a distribution of intensity of light that is irradiated onto a calibration sheet.

The image data obtained by the image taking process are processed by the image processing portion 202 so that only a part of a predetermined luminous intensity is extracted and circles as shown in FIG. 11(a) can be obtained (#13). These circles can be obtained when the image taking portion 21 receives light reflected by the calibration sheet that is irradiated by light from the LEDs. Note that it is possible to perform the image taking process in Step #12 by activating the LEDs to emit light one by one for eliminating interference of light emitted by LEDs.

Figure 11B:
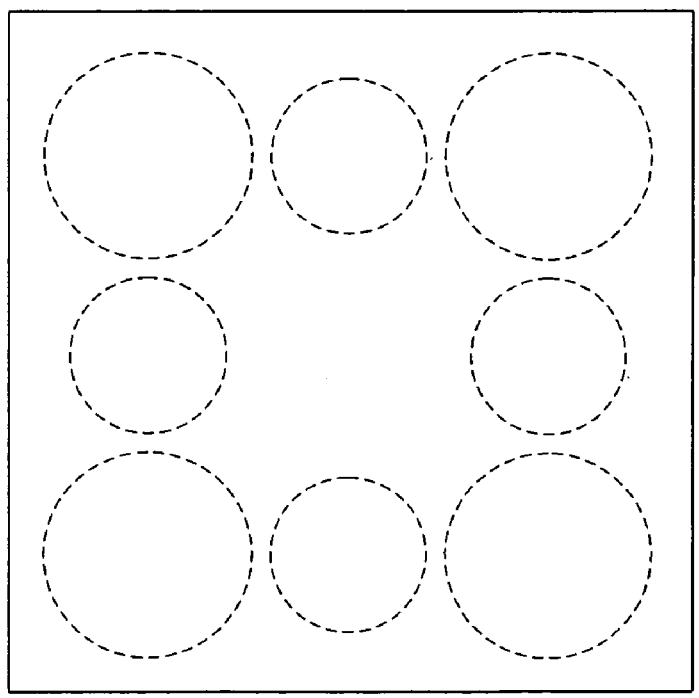

If there is no difference between characteristics of the LEDs in the image taking device 1, the circles obtained by the LEDs 51a-51d must have the same diameter as shown in FIG. 11(b). Similarly, the circles obtained by the LEDs 52a-52d must have the same diameter, too.

A setting information generation portion 203 determines a value of current to be supplied to the LEDs 51a-51d so that the large circles have the same diameter, i.e., so that these circles become identical to the ideal circle shown in FIG. 11(b) (#14). For example, a value of current to be supplied are determined by repeating the process in Steps #12 and #13 while adjusting a value of current so that the circles approach the ideal circle gradually. Alternatively, a value of current is determined in accordance with a known relationship between the diameter of the circle and a value of current. The same process is performed for the small circles so as to determine a value of current to be supplied to the LEDs 52a-52d.

Then, the obtained value of current to be supplied to the LEDs is stored in the memory 22M as the setting information 70 (#15). Note that it is possible to structure so that the process in Steps #13 and #14 is performed by the personal computer 6 and the setting information 70 is stored in a magnetic storage device or the like in the personal computer 6.

Alternatively, it is possible to structure so that a value of current to be supplied is determined in accordance with an operation of the personal computer 6 by an operator. In this case, the process is performed in the following procedure.

The personal computer 6 displays the image of circles shown in FIG. 11(a) obtained by the process of Steps #12 and #13 in the window. In addition, the personal computer 6 displays the setting screen HG1 as shown in FIG. 12 in a window other than the window for the image. Both windows are displayed side by side.

In the setting screen HG1, circles with numbers 1-8 positioned at the upper left correspond to the circles at the same positions in FIG. 11(a), respectively, and they are for notifying the operator of a relationship between each text box and each circle shown in FIG. 11(a).

In text boxes in the column of "rough adjustment", values for adjusting diameters of corresponding circles shown in FIG. 11(a) are entered. Namely, these text boxes are used for setting values of current to be supplied to the LEDs 51a-51d and the LEDs 52a-52d. For example, values having 8 bits within the range of 0-255 are entered in these text boxes. Therefore, when the range of the value of current that can be supplied to the LEDs is 0-150 mA, the value can be set by the step of approximately 0.59 mA.

In text boxes in the column of "fine adjustment", values for adjusting a circuit for fine adjustment are entered. Namely, the value of current set by the rough adjustment can be adjusted precisely. For example, values having 8 bits within the range of −127-128 are entered in these text boxes. Therefore, when a range of the fine adjustment is 10 mA, the value can be set by the step of approximately 0.04 mA.

The operator enters a value of each text box in the setting screen HG1 referring to a diameter of each circle included in the image shown in FIG. 11(a). After entering the values, the operator clicks a retake button. Then, the personal computer 6 instructs the image taking device 1 to take an image.

In the image taking device 1, the power source control portion 201 shown in FIG. 9 controls the LED driving portions 261a-261d and the LED driving portions 262a-262d so that current is supplied to the LEDs 51a-51d and the LEDs 52a-52d in accordance with values entered on the setting screen HG1. Thus, a process that is similar to the process of Steps #12 and #13 shown in FIG. 10 is performed again, and an image of new circles can be obtained.

The personal computer 6 erases the old image of circles that were displayed and displays the new image of newly obtained circles. If a diameter of the newly obtained circles is identical to the diameter of the circle shown in FIG. 11(b), the calibration (adjustment of current) is successfully finished. In this case, the operator clicks a setting button in the setting screen HG1. Then, the values entered on the setting screen HG1 are stored as the setting information 70 in the memory 22M of the image taking device 1. If the diameters are not identical, the setting described above is performed again.

Alternatively, it is possible to combine the adjustment process by the setting information generation portion 203 or the personal computer 6 with the adjustment process by the operator in a manual manner. For example, it is possible to perform the rough adjustment automatically by the computer program and to perform the fine adjustment by the operator's operation.

The procedure for taking an image is basically the same as the case of the first embodiment. However, the power source control portion 201 controls each LED driving portion so that current is supplied to each LED in accordance with the setting information 70 stored in the memory 22M.

According to this embodiment, the calibration process is performed so that a difference between the LEDs is decreased for correcting unevenness of light intensity. Therefore, taking an image of a subject can be performed more appropriately than the first embodiment.

The calibration process may be performed before taking an image or regularly (once a month, for example) as one of maintenance items of the image taking device 1.

Third Embodiment

First subject is a blood vessel pattern of a human being or an animal. For example, if a blood vessel pattern of a human hand, the hand is opposed to the front face of the image taking device 1, and the shutter is released.

If the blood vessel pattern is an object, a lighting device that emits infrared rays is used. Especially, a lighting device that emits near infrared rays well is desirable.

As the filter plate 31, a material is used that has property cutting visible light and light having a little shorter wavelength (i.e., light having a wavelength less than approximately 800 nm) and passing infrared rays, particularly near infrared rays, for example. Therefore, the filter plate 31 plays a role of preventing external visible light from entering the casing 20.

In addition, in order to avoid an influence to a human body that is a subject, light emission quantity, light emission time, and a wavelength of emitted light of the lighting device are adjusted.

The emitted light is irradiated to the subject. However, as visible light and the like are cut by the filter plate 31, only infrared rays are irradiated to the subject. In general, blood vessels of a human being or an animal have property of absorbing infrared rays. Therefore, a portion of a skin of a human or an animal body with blood vessels under the skin reflect the infrared rays little, while a portion of a skin with little blood vessels reflect the infrared rays well.

The image processing portion 202 performs an image processing on the image data obtained by the image taking so as to generate a blood vessel pattern image FA1 as shown in FIG. 7. The image FA1 is treated with a reversing process. Therefore, a white portion indicates a blood vessel pattern. Note that it is possible to structure so that this image processing is performed in the personal computer 6.

According to this embodiment, the subject can be irradiated by the infrared rays substantially uniformly, so that an image of the blood vessel pattern of the subject can be performed appropriately.

Without limiting to a human hand, various parts of a human or an animal body can be subject of the image taking device 1.

[Embodiment of the case where the image taking device 1 is used for a security system in accordance with blood vessel patterns]

Figure 13:
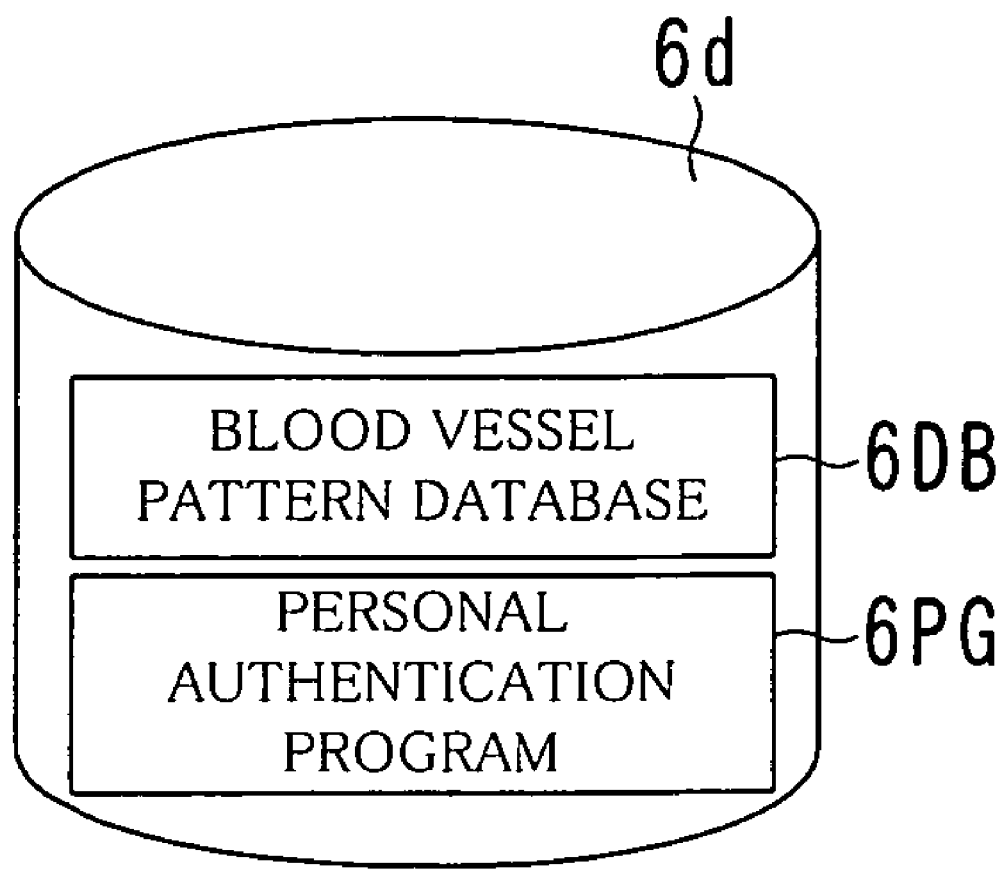
FIG. 13 shows an example of a program stored in a magnetic storage device.
Figure 14:
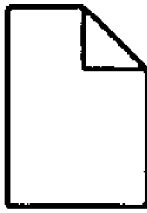
FIG. 14 shows an example of a blood vessel pattern database.
Figure 14:
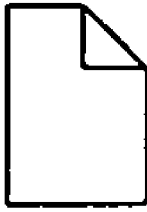
Figure 14:
Figure 15:
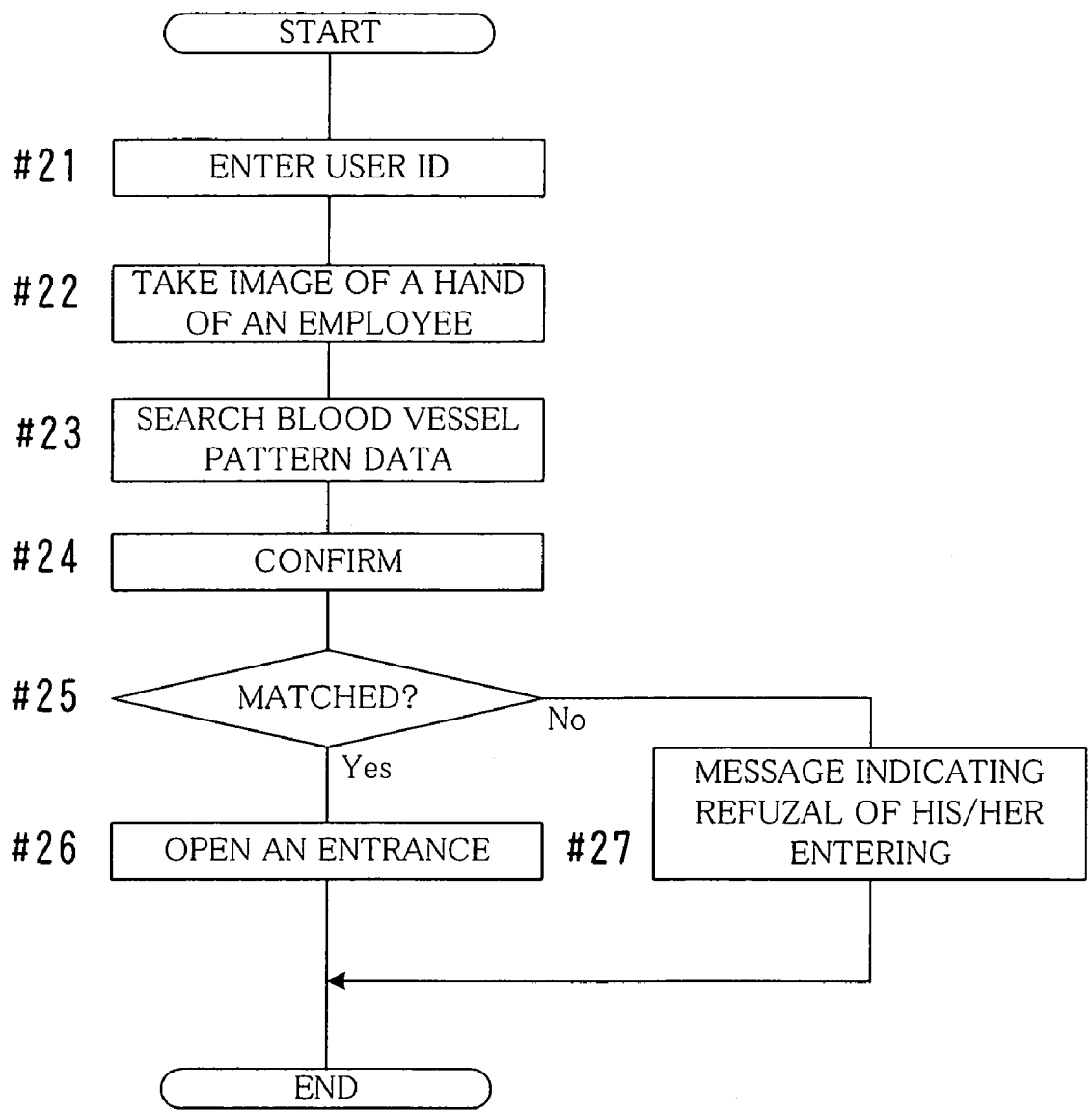
FIG. 15 is a flowchart showing an example of a flow of a personal authentication process.

FIG. 13 shows an example of a program stored in a magnetic storage device 6d, FIG. 14 shows an example of a blood vessel pattern database 6DB, and FIG. 15 is a flowchart showing an example of a flow of a personal authentication process.

Next, a security system that uses the image taking device 1 will be described. Here, a security system 100 (see FIG. 3) in a company is exemplified, which has a facility (such as a research room, a laboratory, a development room or a library) that only employees who were permitted can enter.

A personal computer 6 is placed in the facility. This personal computer 6 is connected to the image taking device 1 according to the first or the second embodiment and a ten key 6t. The image taking device 1 and the ten key 6t are placed at a vicinity of entrance outside the facility. Employees cannot enter the facility without obtaining personal authentication by operating them.

The magnetic storage device 6d of the personal computer 6 stores the blood vessel pattern database 6DB as shown in FIG. 13. This blood vessel pattern database 6DB stores blood vessel pattern data 71 of each employee in connection with a user ID for identifying the employee as shown in FIG. 14.

The blood vessel pattern data 71 are obtained in advance by taking an image of a part of an employee's body, e.g., a hand by the image taking device 1. It is possible to store the blood vessel pattern data 71 as data of the image FA1 of the blood vessel pattern (see FIG. 7) or to store it as data indicating characteristics of the blood vessel pattern such as a thickness, a length, the number of vessels, or an arrangement thereof that is obtained by analyzing the image.

In addition, a personal authentication program 6PG is installed in the magnetic storage device 6d. A personal authentication process is performed for each employee who is going to enter the facility by executing the program in the procedure as shown in a flowchart of FIG. 15.

An employee who wants to enter the facility enters his or her user ID by operating the ten key 6t placed at the entrance (#21) and lets the image taking device 1 take an image of a part of his or her body (#22). The entered user ID and image data obtained by the image taking process are transmitted to the personal computer 6.

The personal computer 6 searches blood vessel pattern data 71 corresponding to the user ID from the blood vessel pattern database 6DB (#23). Then, the personal authentication is performed by determining whether or not the blood vessel pattern data 71 matches the image data obtained by the image taking process (#24).

If they match, i.e., if the employee is authenticated (Yes in #25), the personal computer 6 controls so that the entrance is opened (#26). Thus, the employee can enter the facility. If the employee is not authenticated (No in #25), the employee is informed of a message that indicates that the employee cannot enter and to try the operation again (#27). This message may be announced by a speaker that is provided to the vicinity of the entrance, for example.

Note that the personal computer 6 and the image taking device 1 may be placed at each of facilities for checking whether an employee can enter the facility if the company has plural facilities. In addition, the blood vessel pattern database 6DB and the personal authentication program 6PG may be provided to a server that can be accessed from each of the personal computer 6, so that the personal authentication process (Steps #23 and #24 in FIG. 10) is performed in the server. In this case, it is desirable to use an image taking device 1 according to the second embodiment particularly, as the image taking device 1 provided to each facility.

Without limiting to a security for a facility, the personal authentication process described above may be performed for a log-in process of a computer or the like, an authentication in an electronic payment system or identifying an employee when recording each employee's time of arrival or departure (a time card).

Furthermore, a structure of the entire or a part of the image taking device 1 or the security system 100, the subject of taking an image, an arrangement and luminous intensity of the lighting device, an arrangement of an optical system such as a lens, contents of the processes, the order of the processes, contents of the database and the structures of the screens can be modified if necessary in accordance with the spirit of the present invention.

INDUSTRIAL APPLICABILITY

As described above, the present invention is useful in that an image of a subject can be obtained appropriately by irradiating light uniformly to a subject.

The invention claimed is:

1. An image taking device with a lighting device, comprising;
    a light irradiating portion for irradiating light to a subject;
    a light receiving portion for receiving reflected light from the subject that is irradiated by the light from the light irradiating portion;
    the light irradiating portion including a plurality of light sources, the plurality of light sources being arranged so as to surround the light receiving portion and so as to be substantially flush with one another, and such that only one of the light sources is provided on any line extending from the light receiving portion; and
    each of the light sources is adjusted to emit light of an intensity corresponding to a respective distance from the light receiving portion, the intensity increasing as the respective distance between an arrangement position of each of the light sources and the center of an image taking range increases.

2. The image taking device according to claim 1, further comprising a control portion for adjusting an intensity of light that is emitted from each of the light sources by performing a control of current supplied to each of the light sources.

3. The image taking device according to claim 2, further comprising a luminous intensity information obtaining portion for obtaining luminous intensity information that indicates intensity of light that the subject receives from each of the light sources in accordance with reflected light received by the light receiving portion, the reflected light being received from an object having a uniform reflection factor when each of the light sources irradiate light to the object, wherein the control portion performs the control in accordance with the luminous intensity information so that intensities of light emitted by the light sources having the same distance from the light receiving portion become the same value.

4. The image taking device according to claim 2, control of the lighting device is performed in accordance with a length of an exposure time.

5. The image taking device according to claim 2, control of the lighting device is performed in accordance with exposure timing.

6. A method for controlling a plurality of light sources for irradiating light to a subject, the plurality of light sources being provided for an image taking device for taking an image of a subject, the method comprising:
   irradiating light from the plurality of light sources to an object having a uniform reflection factor;
   receiving reflected light from the object by a light receiving portion, the receiving portion being provided for the image taking device and being substantially surrounded by the plurality of light sources;
   obtaining luminous intensity information indicating intensities of light that the subject receives from the light sources in accordance with the received reflected light from the object; and
   adjusting intensities of light irradiated by the light sources when taking an image so that the intensities of light, irradiated by the light sources disposed at positions of the same distance from the light receiving portion, become identical to each other and so that the intensities of light irradiated by the light sources disposed farther from the light receiving portion become higher in accordance with the luminous intensity information.

7. A computer readable medium storing a program which causes a computer to control a plurality of light sources for irradiating light to a subject, the plurality of light sources being provided for an image taking device for taking an image of a subject, the program causing the computer to execute processes comprising:
   a process obtaining luminous intensity information indicating respective intensities of light that the subject receives from the plural light sources in accordance with reflected light received by a light receiving portion provided for the image taking device, the image taking device being substantially surrounded by the plurality of light sources, the reflected light being received from an object having a uniform reflection factor when each of the light sources irradiates light to the object; and
   a process adjusting intensities of respective light irradiated by the plural light sources when taking an image so that the intensities of light irradiated by the plural light sources disposed at positions of the same distance from the light receiving portion become identical to each other and so that the intensities of respective light irradiated by the plural light source disposed farther from the light receiving portion become higher, in accordance with the luminous intensity information.

8. A personal authentication system for authenticating a person, comprising:
   an image taking device according to claim 1;
   a storage portion for storing an image of each person in connection with ID information for identifying the person, the image of each person being taken in advance;
   an input portion for entering ID information; and
   an authenticating portion for authenticating a person who entered the ID information by comparing the image corresponding to the ID information stored in the storage portion with the image obtained by the image taking device that takes an image of the person who entered the ID information for authentication.

9. A personal authentication system for authenticating a person in a plurality of facilities, comprising:
   an input portion for entering ID information for identifying a person and an image taking device according to claim 3, which are provided for each of the facilities; and
   a server that is connected to each of the image taking devices, the sewer including
   a storage portion for storing an image of each person in connection with ID information of the person, the image of each person being taken in advance, and an authenticating portion for authenticating a person who entered the ID information by comparing the image stored in the storage portion corresponding to the ID information entered by the input portion with the image obtained by the image taking device that takes an image of the person who entered the ID information for authentication.

10. An image taking device comprising:
    a light receiving portion to receive light reflected from a subject; and
    a plurality of light sources provided at various positions around the light receiving portion, so as to be substantially flush with one another, and such that only one of the light sources is provided on any line extending from the light receiving portion, to emit light onto the subject;
    wherein a respective intensity of each of the light sources increases corresponding to an increased distance from the light receiving portion.

11. An image taking device with a lighting device, comprising:
    a light irradiating portion for irradiating light to a subject;
    a light receiving portion for receiving reflected light from the subject that is irradiated by the light from the light irradiating portion;
    the light irradiating portion including a plurality of light sources, the plurality of light sources being arranged so as to surround the light receiving portion;
    each of the light sources is adjusted to emit light of an intensity corresponding to a respective distance from the light receiving portion;
    a control portion for adjusting an intensity of light that is emitted from each of the light sources by performing a control of current supplied to each of the light sources; and
    a luminous intensity information obtaining portion for obtaining luminous intensity information that indicates intensity of light that the subject receives from each of the light sources in accordance with reflected light received by the light receiving portion, the reflected light being received from an object having a uniform reflection factor when each of the light sources irradiate light to the object, wherein the control portion performs the control in accordance with the luminous intensity information so that intensities of light emitted by the light sources having the same distance from the light receiving portion become the same value.

12. A personal authentication system for authenticating a person in a plurality of facilities, comprising:
an input portion for entering ID information for identifying a person and an image taking device according to claim 11, which are provided for each of the facilities; and
a server that is connected to each of the image taking devices, the sewer including
a storage portion for storing an image of each person in connection with ID information of the person, the image of each person being taken in advance, and an authenticating portion for authenticating a person who entered the ID information by comparing the image stored in the storage portion corresponding to the ID information entered by the input portion with the image obtained by the image taking device that takes an image of the person who entered the ID information for authentication.

13. An image taking device with a lighting device, comprising:
a light irradiating portion for irradiating light to a subject;
a light receiving portion for receiving reflected light from the subject that is irradiated by the light from the light irradiating portion;
the light irradiating portion including a plurality of light sources, the plurality of light sources being arranged so as to surround the light receiving portion;
wherein each of the light sources is adjusted to emit light of an intensity corresponding to a respective distance from the light receiving portion, the intensity increasing as the respective distance between an arrangement position of each of the light sources and the center of an image taking range increases; and
a luminous intensity information obtaining portion for obtaining luminous intensity information that indicates intensity of light that the subject receives from each of the light sources in accordance with reflected light received by the light receiving portion, the reflected light being received from an object having a uniform reflection factor when each of the light sources irradiate light to the object, wherein the control portion performs the control in accordance with the luminous intensity information so that intensities of light emitted by the light sources having the same distance from the light receiving portion become the same value.

14. A personal authentication system for authenticating a person in a plurality of facilities, comprising:
an input portion for entering ID information for identifying a person and an image taking device according to claim 13, which are provided for each of the facilities; and
a server that is connected to each of the image taking devices, the server including a storage portion for storing an image of each person in connection with ID information of the person, the image of each person being taken in advance, and an authenticating portion for authenticating a person who entered the ID information by comparing the image stored in the storage portion corresponding to the ID information entered by the input portion with the image obtained by the image taking device that takes an image of the person who entered the ID information for authentication.

15. An image taking device with a lighting device, comprising:
a light irradiating portion for irradiating light to a subject;
a light receiving portion for receiving reflected light from the subject that is irradiated by the light from the light irradiating portion;
the light irradiating portion including a plurality of light sources, the plurality of light sources being arranged so as to surround the light receiving portion, and such that only one of the light sources is provided on any line extending from the light receiving portion;
wherein each of the light sources is adjusted to emit light of an intensity corresponding to a respective distance from the light receiving portion, the intensity increasing as the respective distance between an arrangement position of each of the light sources and the center of an image taking range increases;
a control portion for adjusting an intensity of light that is emitted from each of the light sources by performing a control of current supplied to each of the light sources; and
a luminous intensity information obtaining portion for obtaining luminous intensity information that indicates intensity of light that the subject receives from each of the light sources in accordance with reflected light received by the light receiving portion, the reflected light being received from an object having a uniform reflection factor when each of the light sources irradiate light to the object, wherein the control portion performs the control in accordance with the luminous intensity information so that intensities of light emitted by the light sources having the same distance from the light receiving portion become the same value.

16. A personal authentication system for authenticating a person in a plurality of facilities, comprising:
an input portion for entering ID information for identifying a person and an image taking device according to claim 15, which are provided for each of the facilities; and
a sewer that is connected to each of the image taking devices, the sewer including
a storage portion for storing an image of each person in connection with ID information of the person, the image of each person being taken in advance, and an authenticating portion for authenticating a person who entered the ID information by comparing the image stored in the storage portion corresponding to the ID information entered by the input portion with the image obtained by the image taking device that takes an image of the person who entered the ID information for authentication.

* * * * *

UNITED STATES PATENT AND TRADEMARK OFFICE
CERTIFICATE OF CORRECTION

| | |
|---|---|
| PATENT NO. | : 7,415,202 B2 |
| APPLICATION NO. | : 11/229571 |
| DATED | : August 19, 2008 |
| INVENTOR(S) | : Naoyuki Fujimoto et al. |

It is certified that error appears in the above-identified patent and that said Letters Patent is hereby corrected as shown below:

On the Title Page Item (75) (Inventors), Lines 2-3, after "Kiyoshi Chinzei," change "Kato" to --Daito--.

Column 10, Lines 44-45, change "comprising;" to --comprising:--.

Column 12, Line 18, change "sewer" to --server--.

Column 13, Line 7, change "sewer" to --server--.

Column 13, Line 12, change "1D" to --ID--.

Column 14, Line 43, change "sewer" to --server--.

Column 14, Line 44, change "sewer" to --server--.

Signed and Sealed this

Twenty-ninth Day of June, 2010

David J. Kappos
*Director of the United States Patent and Trademark Office*